April 4, 1961
M. FORRO
2,978,587
DEVICE FOR DETERMINING THE ABSORPTION
CURVE OF RADIOACTIVE ISOTOPES
Filed May 11, 1955
4 Sheets-Sheet 1
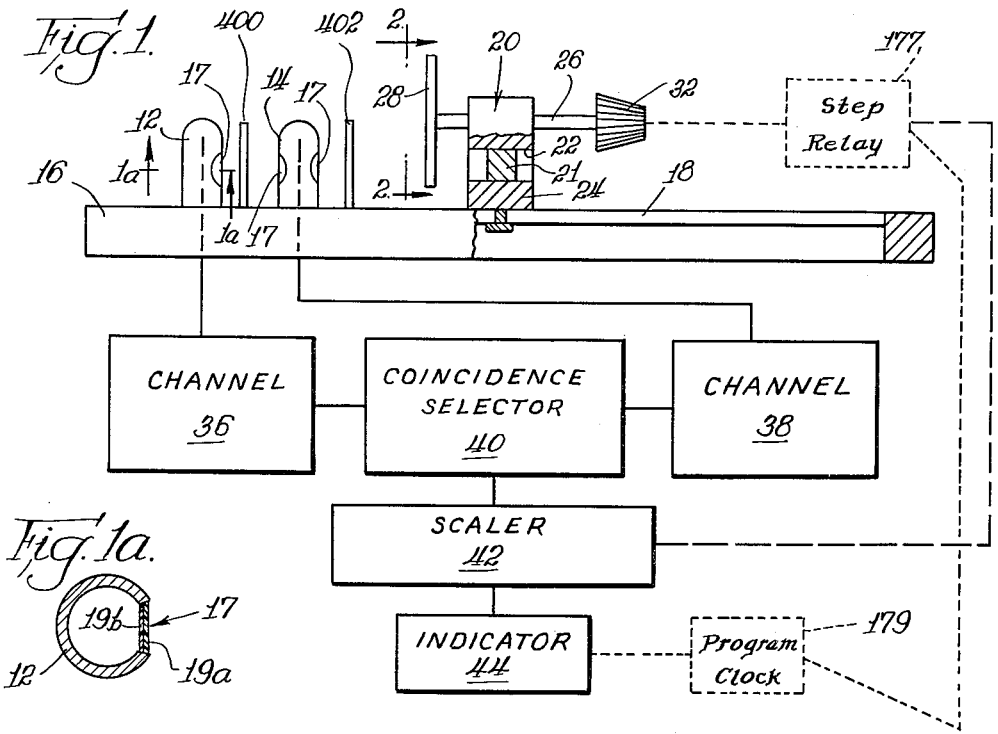
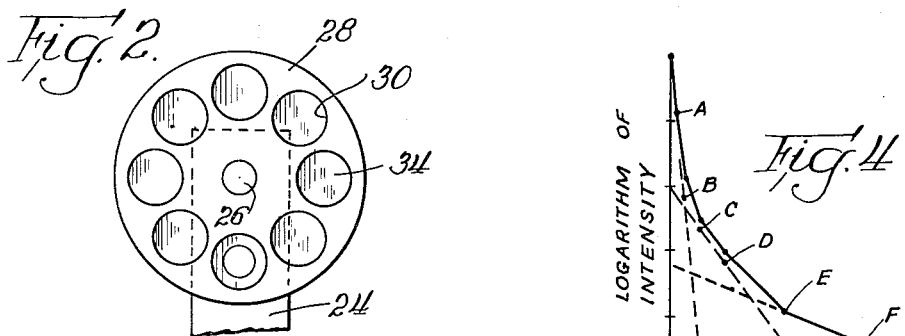
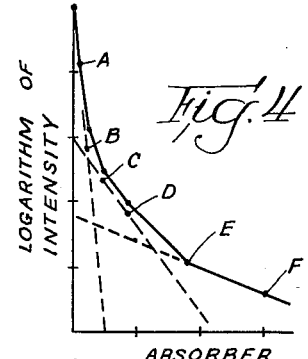
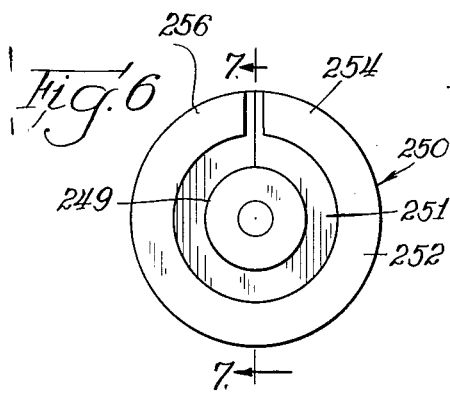
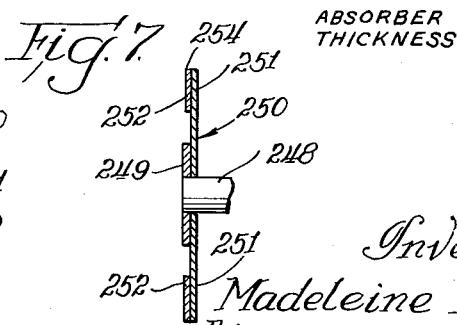
Inventor:
Madeleine Forro
By: Marshall A. Burmeister
Atty.

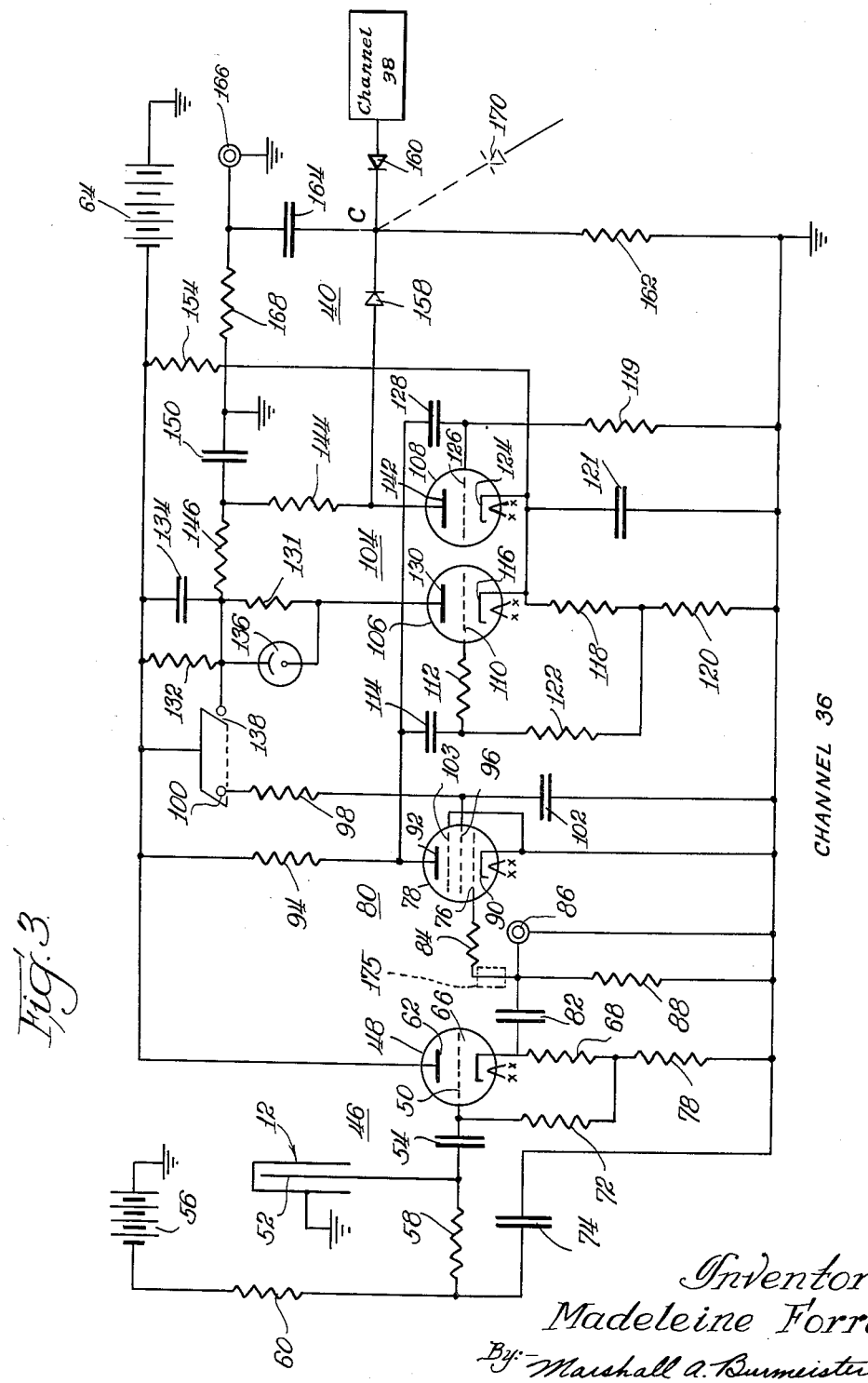

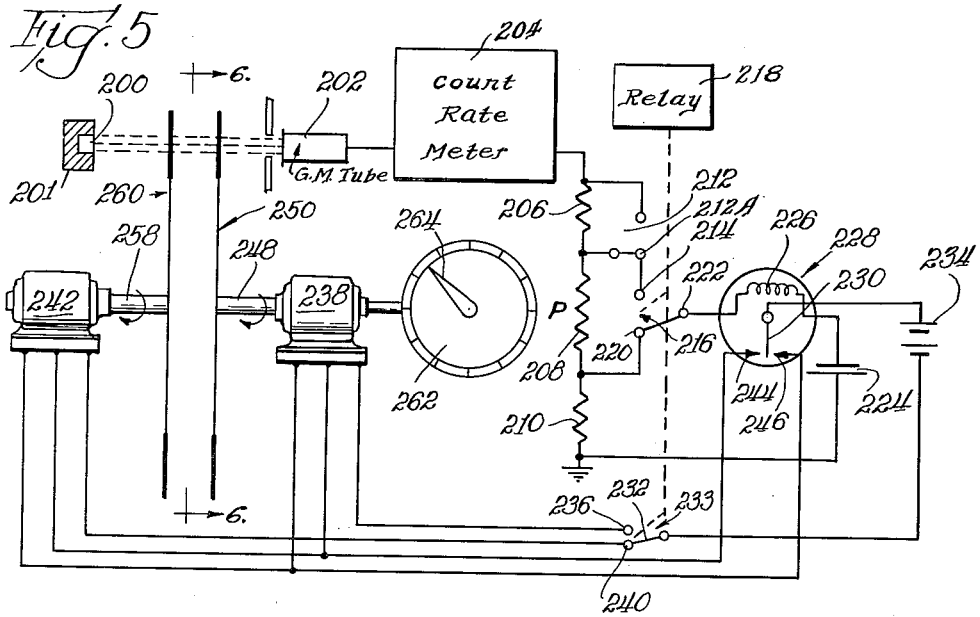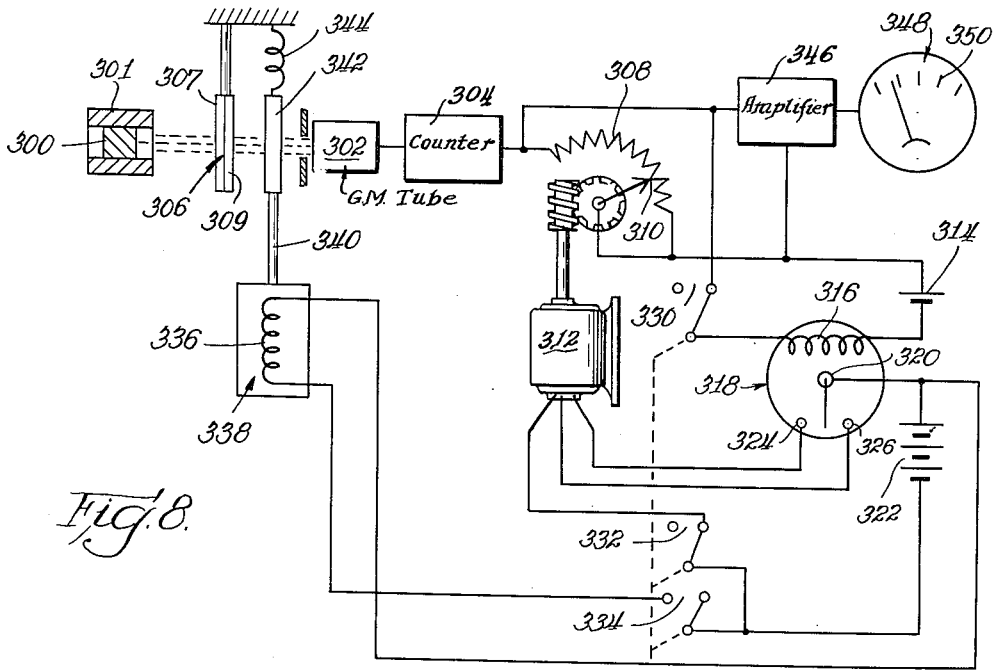

April 4, 1961 M. FORRO 2,978,587
DEVICE FOR DETERMINING THE ABSORPTION
CURVE OF RADIOACTIVE ISOTOPES
Filed May 11, 1955 4 Sheets-Sheet 4

Inventor:
Madeleine Forro
By Marshall A. Burmeister
Atty.

United States Patent Office 2,978,587
Patented Apr. 4, 1961

2,978,587

DEVICE FOR DETERMINING THE ABSORPTION CURVE OF RADIOACTIVE ISOTOPES

Madeleine Forro, 833 Lincoln St., Evanston, Ill.

Filed May 11, 1955, Ser. No. 507,675

19 Claims. (Cl. 250—83.6)

The present invention relates generally to devices for identifying unknown radioactive isotopes, and for determining the ratio of a plurality of unknown radioactive isotopes in a mixture.

One important application of the invention is in neutron activation analysis to determine isotopes which can not be discerned by means of their different decay times. Another application is to identify the nature of contaminations on utensils, foods, etc. in areas of A or H bomb blasts and thus help to decide whether the contaminated objects have to be discarded, stored for a certain length of time, or properly processed to overcome the health dangers due to their activity. For example, the invention would help to determine the nature of seafood contaminations after H bomb tests or in inshore atomic blasts of a future war.

A third application of the invention is in isotope production plants to determine the minute amounts of active impurities produced together with the isotope requested.

A fourth application of the invention is in biological research, rendering the simultaneous use of several tracers on the same subject possible, thus eliminating the errors due to differences in experimental circumstances which arise when the tracers are used in sequence on the same subject, or on different subjects.

A fifth application of the invention is to identify the nature of contaminations in laboratories in order to enable the determination of the most effective decontamination procedure.

The invention has utility for all purposes where a quick qualitative or quantitative analysis is desirable and the activity of the sample is low. It can be used in cases where all other methods fail.

The identification of radioactive isotopes can be achieved by different methods. One method is to measure its decay time.

It is well known that the intensity with which radioactive isotopes emit particles decreases according to characteristic decay curve. As a result of this fact, radioactive isotopes can be classified in terms of their half-lives, i.e., the period of time required for the radioactive isotope to reduce the number of emitted particles by a factor of two. The fact that a particular radioactive emitter has a characteristic half-life has been used to deteremine the radioactive isotopes within the emitter. The curve obtained by plotting the relative activity of a radioactive emitter on a logarithmic ordinate and time on the abscissa is a straight line for a single radioactive isotope and a curved line for radioactive emitters containing a plurality of radioactive isotopes. As a result, a curved line appearing on such a graph may be reduced into its component parts, thus obtaining the half-lives of the individual radioactive isotopes. Since the half-life of known radioactive isotopes is constant and known, many isotopes may be determined in this manner. This method of radioactive emitter analysis is described in "Radioactivity and Nuclear Physics," by James M. Cork, published by D. Van. Nostrand Company, Inc. (1947).

This method of isotopic analysis of a radioactive emitter has several disadvantages. In the first place, there are many isotopes which have approximately the same half-life as one or more other isotopes, and in cases of this type, it is difficult to determine which of these isotopes is producing the emission from a radioactive emitter. In the second place, it is a long and tedious task to plot a radioactive decay curve, since time is one of the elements of the function. Further, in the case of radioactive emitters which may contain a plurality of radioactive isotopes, it is necessary to carry out the plotting operation for a long period of time before one can be certain that the isotope with the longest half-life has been determined.

Another method of identifying radioactive isotopes which have beta spectra is by means for measuring the shape of the beta spectra with a magnetic spectrometer. Magnet spectrometers are very elaborate devices which need a great skill to operate. Furthermore, they can not be used with minute activities. For instance, if one wants to analyze a mixture containing 5 beta components and requires an energy resolution of at least 2 percent, the analysis could be completed within a day only if the activity of the sample exceeds 3 microcuries.

A further method of identifying radioactive isotopes is by measuring the energy spectrum of its gamma radiation with a scintillation spectrometer. Such an instrument is also elaborate, if an energy resolution of 2 percent is required. Moreover, they can be used only for qualitative identification of components in an isotope mixture, but not, or only with great difficulties, to perform a quantitative analysis.

It is one of the objects of the present invention to provide a method of identifying radioactive isotopes, and a device for accomplishing the method, which will eliminate the necessity of taking a plurality of intensity measurements over a period of time. Further, it is an object of the present invention to provide a method of isotope analysis of radioactive emitters, and a device for carrying out these methods, which does not require a plurality of intensity measurements taken over a period of time. Also, it is an object of the present invention to provide a method of identifying radioactive isotopes, and a device for accomplishing the method, which is not dependent upon the half-life of isotopes, thus eliminating confustion between isotopes having approximately the same half-lives.

Further, it is an object of the present invention to provide a method of radioactive emitter analysis which determines the relative amounts of a plurality of radioactive isotopes in an emitter.

It is also an object of the present invention to provide a device for automatically identifying radioactive isotopes.

It is an object of the present invention to provide a device which can analyze samples with much lower activities than those required for beta spectrometry. It is also an object of the present invention to provide a method which does not require elaborate and expensive instrumentation, and which can be operated by unskilled personnel.

Further, it is an object of the present invention to provide an instrument which is portable and could be used in case of an atomic attack as a field instrument.

The inventor has found that the absorption curve of beta emitters in materials of high atomic number, i.e., elements having an atomic number of at least 47, is approximately a straight line in a semi-logarithmic plotting, providing the detector used has a relative opening of not more than ten percent. Under these conditions, there is sufficient scattering in the absorber to cause beta particles to be exponentially absorbed in the absorber material, rather than principally at a distance corresponding to the length of the path of the beta particles. The slope of the absorption curve equals the absorption coefficient of the beta spectrum in the material from which the absorber was made.

This absorption coefficient $\mu$ can be determined by observing the intensity transmitted from the radioactive isotope, $J_1$ and $J_2$ at two absorber thicknesses $a_1$ and $a_2$ according to the equation:

$$\mu = \ln(J_1/J_2)/(a_2-a_1)$$

From the value of the absorption coefficient, the end-point energy of the beta spectrum can be determined according to the following equation:

$$E = A\mu^{-2/3} + B$$

where E is the end-point energy of the beta spectrum in million electron volts, and A and B are constants depending upon the relative opening of the detector and upon the material of the used absorber. The inventor has found that when the relative opening is 2 percent, and gold is used as absorber, $A=9.00$ and $B=0.17$. These facts are set forth in the inventor's paper entitled "Method for the Determination of the End-Point Energy of Beta Emitters," published in the Physical Review, November 15, 1953.

More than 800 radioactive isotopes, most of them artificially produced, and most of them beta emitters, are known at the present time. Virtually all of these radioactive isotopes are known to have end-point energies which uniquely distinguish them from all other radioactive isotopes. For example, the end-point energy of carbon-14 is 0.155 mev., chlorine-36 is 0.714 mev., thallium-204 is 0.765 mev., bismuth-217, 1.17 mev., yttrium-90, 2.23 mev. It is thus clear that radioactive isotopes may be instantly identified by applying the inventor's methods by observing the intensity transmitted from the radioactive isotope through two different thicknesses of absorbers according to the present invention.

The here described findings are used in the present invention to provide a method and an instrument for performing quick qualitative and quantitative analysis of radioactive mixtures. These scientific findings are described in a paper of the inventor, published Zeitschrift für Physik, vol. 138, pages 441–448, 1954.

The basic principle of the method is as follows:

The absorption curve of a mixture of beta emitting isotopes plotted on semi-logarithmic paper can always be resolved into as many straight lines as the number of beta components in the mixture. From the slopes of each of these straight lines, the corresponding beta component can be identified. The process of resolving a curve into staright lines can be made either graphically or numerically. The determination of the slope of these straight lines requires only the measurement of the intensities at two absorber thicknesses which can be chosen in the most favorable manner in the high intensity region. Figure 4 illustrates the analysis of a mixture with three components. From the points E and F the slope of the most pentrating beta component is determined. Extending this slope toward smaller absorber thicknesses and substracting the corresponding intensities, the points C and D on the difference curve furnish the slope of the second hardest component. Repeating the procedure as above, the remaining difference curve is found to be a straight line, the slope of which can be evaluated from the points A and B. The analysis thus revealed that the mixture contained three isotopes. From the slopes of the straight lines the three isotopes can be identified as: Pm-147; Tl-204 and P-32. The extension of the straight lines to zero absorber thickness and the application of appropriate corrections gave for the relative intensities of the mentioned components as 99.7%, 0.26% and 0.04%, respectively. An analysis by means of differences in decay times would have failed in this case.

The present invention may be more readily understood by consideration of the remaining portions of this disclosure, particularly when viewed in the light of the drawings, in which:

Figure 1 is a view, partially in the form of a schematic diagram, illustrating a device constructed according to the teachings of the present invention and capable of carrying out the methods of the present invention;

Figure 1a is a sectional view taken along line 1a—1a of Figure 1;

Figure 2 is an elevational view of the combination sample holder and absorber assembly taken along line 2—2 of Figure 1;

Figure 3 is a schematic electrical circuit diagram of a portion of the device illustrated in Figure 1;

Figure 4 is a graph of the logarithm of intensity measurements ploted on the ordinate and absorber thicknesses plotted on the abscissa for a particular beta particle emitter;

Figure 5 is a device, partially schematic, for automatically identifying a radioactive isotope constructed according to the teachings of the present invention;

Figure 6 is a sectional view taken along line 6—6 of Figure 5;

Figure 7 is a sectional view taken along line 7—7 of Figure 6;

Figure 8 is a schematic view of a device for automatically identifying radioactive isotopes which constitutes another embodiment of the invention;

Figure 9:
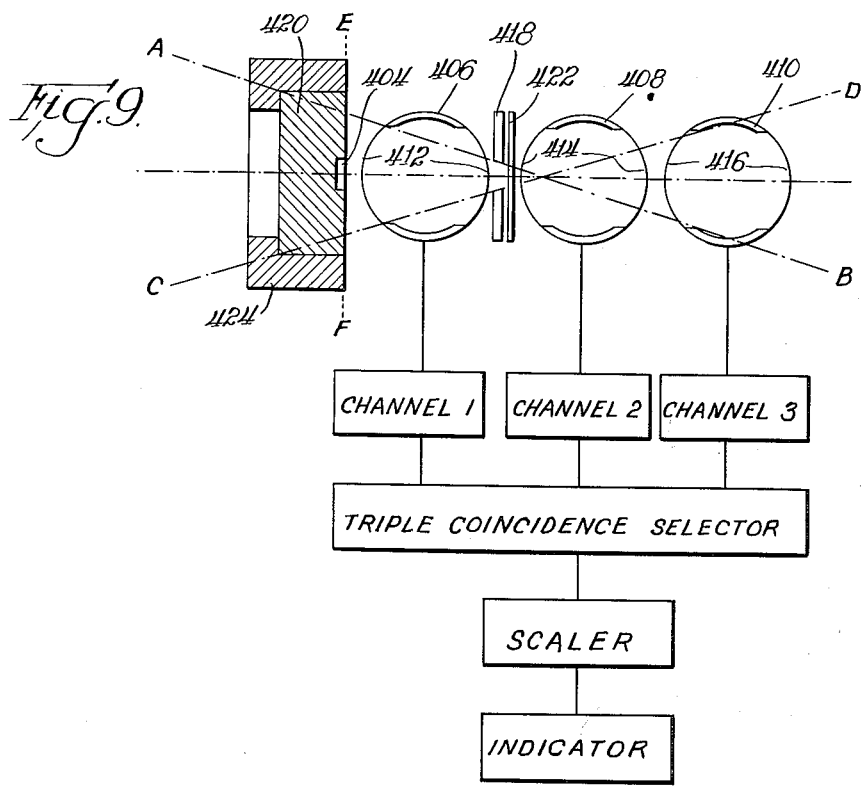
Figure 9 is a schematic view of another embodiment of the invention used with sources emitting gamma quanta in addition to the beta particles.

Figure 1 illustrates a radiation detecting device suitable for practicing the present invention. In this device, a a pair of Geiger-Müller tubes (or beta proportional counters) 12 and 14 are mounted upon a support member 16 which is provided with an elongated slot 18 aligned with the two counters 12 and 14. The counters should have thin walls which permit even the softest beta rays emitted from the source to reach the furthest counter with less than 10 percent attenuation. It is preferable, in order to keep the natural background-rate of the instrument as low as possible, to use thick walled counters but to provide on the parts facing the source or the next counter thin windows, designated 17. These windows can be made of a plastic film 19a coated on their insides with a conductive layer 19b. A combination sample holder and absorber assembly 20 is slidably keyed within the slot 18, so that a sample, designated 21, disposed within the holder may be positioned relative to the counters 12 and 14. The combined sample holder and absorber assembly 20 has a body 24 provided with a channel 22 extending through the body 24 parallel to the slot 18 and adapted to contain the sample 21.

A shaft 26 also extends through the body 24 of the sample holder and absorber assembly 20 parallel to the slot 18, and a disc 28 is attached to the end of the shaft 26 between the counters 12 and 14 and the body 24. The disc 28 confronts the channel 22 in the body 24, and a plurality of apertures 30 are disposed in the disc 28 adjacent to the periphery thereof. The shaft 26 is rotatably disposed within the body 24 and provided with a knob 32 at its end opposite to the disc 28. The apertures 30 are positioned within the disc to align with the channel 22 in the body of the sample holder and absorber assembly when rotated to confront the channel 22.

In the particular construction of the invention illustrated in Figures 1 and 2, there are eight apertures 30 disposed above the periphery of the disc 28. Each of the apertures 30 is provided with a gold absorber 34 of a different thickness, the thickness of the absorber being known, so that absorbers of different thickness may be disposed between the sample 24 and the counters 12 and 14 by merely rotating the disc 28 to align the desired absorber with the channel 22. The gold absorbers 34 are of different thicknesses and range between a minimum thickness set by fabrication limitations and a maximum thickness limited by the range of beta particles. In the illustrative construction, the maximum and minimum thicknesses are approximately 2 milligrams per square centimeter and about 10 micrograms per square centimeter, respectively.

The counters 12 and 14 are connected to separate channels 36 and 38, respectively, and the channels 36 and 38 are interconnected by a coincidence network 40. The output of the coincidence network 40 is fed to a scaler 42 which is in turn connected to an indicator 44. In those embodiments of the invention in which three counters are used, each is connected to a separate channel and the channels are interconnected by a triple-coincidence network (see Figure 9).

As illustrated in Figure 3 triode 48 is connected as a cathode follower to insure low input impedance for the G.-M. counter 12, or beta-proportional counter, to insure a low output impedance for the monitoring of the pulses through connector 86, and for the input of the following amplifier. The pentode 80 is used as an amplifier and as a phase inverter. If beta-proportional counters are used as detectors instead of G.-M. counters, a two-stage amplifier, designated 175 in dotted lines, must be interposed between tubes 48 and 78 to amplify the small pulses supplied by the beta-proportional counter.

A triode 106 is connected to an indicating glow-lamp 136 and has the role of indicating the proper operation of the counter 12 in this channel. The triode 108 is a pulse shaper and supplies the pulses for the coincidence network. The shaping of the pulses is performed partly by means of the strong negative bias applied to the grid 126, which results partly in cutting off the flat part of the exponential trailing edge of the pulse and partly through the grid current which limits the peak of the pulse. As a result the pulses appearing on the plate 142 of tube 108 have a fairly rectangular shape.

The coincidence network consists of the resistance 162 and the diodes 158 and 160 in the case of a double coincidence circuit; and of the resistance 162 and the diodes 158, 160 and 170 in case of a triple coincidence circuit.

The negative pulses from the G.-M. counter 12 have a few volt pulse height and trigger the grid 76 of the pentode 78. The amplified positive pulses from the plate 92 of pentode 78 trigger the grids 110 and 126 of tubes 106 and 108. These two tubes are normally in a non-conductive condition. The positive pulse arriving on the grid 110 of vacuum tube 106 will render this tube conductive and excite the glow-lamp 136 during the period of a pulse. Similarly a positive pulse arriving on grid 126 of tube 108 will render this tube conductive and initiate a potential drop of a few volts on the plate 142 thereof. When vacuum tube 108 is non-conducting, a current will flow through the resistor 162, diode 158, resistor 144, resistor 146 and resistor 132. Similarly a current flows through the corresponding resistors, diode 160 and resistor 162 of channel 38, when tube 108 in channel 38 is non-conducting.

Since the resistor 162 is large compared to all other resistors and to the resistance of the diodes in these two circuits, the current intensity will be determined by the potential of the power source 64 and the resistance 162. Whenever a beta particle impinges upon counter 12 and triggers it, as a result, the potential drop appearing on plate 142 in channel 36 will cut off the current through diode 158. Nevertheless the intensity of the current through the resistor 162 will not be changed because at the same time the current through the conductive diode 160 will accordingly increase. However, should counters 12 and 14 be triggered at the same time (by the same beta particle) and therefore the currents through both diodes 158 and 160 (through all three diodes 158, 160 and 170 respectively in case of a triple coincidence circuit) but off simultaneously, the current flowing through the resistor 162 will fall, and the potential of the junction of the diodes 158 and 160, designated point C, will drop considerably, thus supplying a negative pulse which is fed to the scaler through condenser 164 and connector 166, actuating the indicator.

The switches 100 and 138 can be used to disconnect one of the channels 36 or 38 from the coincidence network 40. This is accomplished by disconnecting the potential from grid 96 of the pentode 78 and at the same time from the glow lamp 136 and plate 130 of tube 106. The current now flows through the resistor 162, diode 158, resistor 144, resistor 146 and resistor 132; however, due to the potential drop on resistor 132, the plate 142 of triode 108 will be on a lower potential than the junction point C, therefore, the current through diode 158 will be constantly cut off and not only cut off during the duration of a pulse in channel 36. As a consequence, if in a double coincidence net-work the switches 100 and 138 in channel 36 are open, the scaler connected to connector 166 will count only the pulses from channel 38. In a triple coincidence network, if the switches 100 and 138 in one of the channels are open, the scaler will register only the double-coincidences arising between the two other channels.

In order to more fully demonstrate the present invention, assume that a sample of unknown beta emitting isotopes is placed within the sample holder and absorber assembly 20. The thinnest absorber 34 is then rotated by turning knob 32 to confront the channel 22 in the body 21 of the sample holder and absorber assembly 20. The intensity of the beta radiation from the sample 24 is then noted from the indicator 44. The next thickest absorber 34 is then rotated to confront the channel 22, and a second intensity indication is noted. This process is then repeated using thicker and thicker absorbers each time until the absorbtion curve is determined (see Figure 4). The intensity or count rate from the channels 36 and 38 may be adjusted to a suitable level before the indications with different absorber thicknesses are made by positioning the sample holder and absorber assembly 20 within the slot 18 of the support member 16.

In this embodiment of the invention, the operator has to change the absorber thicknesses manually and register the intensities given by the instrument for each absorber thickness. In cases when the source has a low activity, in order to obtain the necessary accuracy, long measuring times are required. To overcome this inconvenience, the exchange of the absorbers of different thicknesses and the registration of the corresponding intensities can be made automatically in the following manner. The disc 28 of Figure 2 holding in its apertures 30 the different absorbers is actuated automatically, for instance by means of a step relay, illustrated by dotted lines at 177. The indicator 44 is substituted with a data printer. A program clock 179 actuates after pre-set time intervals the data printer and at the same time the step relay which in turn rotates the disc to the next aperture covered with the next thicker absorber 34.

This device enables the operator to set the time intervals for each absorber thickness in such a manner that the time intervals for the thicker absorbers should be longer, thus he can, a priori, set the desired accuracy for each point of the absorption curve.

The whole measuring cycle can again automatically be recycled, that is the measurements made in the opposite sequence of absorber thicknesses. This method has great advantage in such cases when the activity of the source decreases rapidly. The re-cycling compensates for the decay. On the other hand, the decay times of the beta components can be obtained from the printed data thus giving a further lead in the identification of the isotopes.

A further variant of this device uses, instead of an electrical program clock 179, a scaler which gives an electrical signal after a predetermined number of counts have accumulated (so called pre-set scaler) for scaler 42, and this electrical signal is used to actuate the changing mechanism of the absorbers and the data printer as indicated by the dashed line in Figure 1 between the scaler 42 and the step relay 177.

Another variant of this device uses, instead of a data printer for each absorber thickness, a separate mechanical register for indicator 44 in each channel 36 and 38. Each of these registers accumulate the counts for the corresponding absorber thickness over several cycles.

In cases where the activity of the source is so low that the counting-rates are comparable with the natural background-rate of the instrument, it is advisable to interpose, between the measurements with different absorber thicknesses, a measurement with an absorber of sufficient thickness to prevent all beta rays emitted from the source from reaching the detector. When this absorber is aligned in the radiation beam the indicated intensity will correspond to the background. This procedure is also advised in all sites where for some reason the background fluctuates rapidly.

Figure 5 illustrates a device for automatically identifying a radioactive isotope. In this device, the detector is a single Geiger-Müller tube 202 which has a relative opening of not more than 10%, just as the Geiger-Müller tubes 12 and 14 of the device illustrated above. The Geiger-Müller tube 202 is connected to a count rate meter 204 which produces an output current proportional to the number of counts of the Geiger-Müller tube 202. The portion of the device shown in Figure 1 which includes the tubes 12 and 14, the channels 36 and 38, the coincidence network 40, and the scaler 42 could be substituted for the single Geiger-Müller tube 202 of the device, the output of the scaler 42 being substituted for the output of the tube 202 in the present device. The output current of the count rate meter 204 flows across three serially connected resistors 206, 208 and 210, so that a voltage appears across the three resistors proportional to the number of counts registered by the count rate meter.

A single pole, double throw switch 212 has its stationary contacts connected to the terminals of resistor 206, and the movable, or pole, contact 212A of the switch 212 is connected to one of the stationary contacts 214 of one pole 216 of a double pole, double throw time responsive switch 218. The other stationary contact 220 of this pole 216 is connected to the junction of resistors 208 and 210. The pole contact 222 of the first pole 216 of the time responsive switch 218 is connected in series opposition with a constant voltage source, such as a cell 224, through the armature 226 of a meter relay 228. The meter relay 228 is a single pole double throw relay, and the pole contact 230 of the meter relay 228 is connected to the pole contact 232 of the second pole 233 of the time responsive relay 218 through a source of power, such as battery 234. One of the stationary contacts 236 of the second pole 223 of the time responsive relay 218 is connected to one of the three terminals of a first reversible motor 238, and the other stationary contact 240 of the second pole 233 of the time responsive relay 218 is connected to one of the three terminals of a second reversible motor 242. The other two terminals of the two reversible motors 238 and 240 are electrically connected in parallel and to the two stationary contacts 244 and 246 of the meter relay 228.

The reversible motor 238 has a shaft 248 which is connected to a hub 249 of a disc absorber 250. The disc absorber 250 has a circular plate 251 or disc made from a material of low atomic number, and the portion of the disc 251 adjacent to its periphery is located in the path of the beta rays emitted from the source 200 and impinging on the detector 202. This peripheral portion of the disc 251 is as thin as technically possible, and is provided with a coating 252. This portion of the disc may be constructed by using a plastic film and is approximately .1 mg./cm.$^2$. It is along this periphery that the coating 252 with a material of high atomic number, e.g. gold, is applied in such a manner that the thickness of this material of high atomic number is continuously increasing along the circumference. The coating 252 can be made for example by vacuum evaporation of a gold layer on the plastic film disc 251. Hence as illustrated in Figure 6 and Figure 7, one portion of the gold coating 252 is very thin, designated 254, and the coating thickness increases from this portion 254 in the clockwise direction until it reaches a maximum thickness immediately adjacent thereto, designated 256. By means of turning the disc 250, the thickness of the absorber in the path of the beta rays can be continuously increased.

The reversible motor 242 also has a shaft 258 attached to a disc 260 which is identical in construction with the disc 250. Further, the disc 260 confronts the disc 250 and is disposed in the path between source and the Geiger-Müller tube 202, as illustrated in Figure 5. Shaft 248 extends through the reversible motor 238, and a dial 262 with a pointer 264 is disposed at the end of the shaft 248 opposite to the disc 250.

When a radioactive isotope is to be identified, discs 250 and 260 are placed in the rotational position in which the minimum absorber portion 254 is disposed on the axis between the source 200 and the Geiger-Müller tube 202. After a source 200 is in place and the device actuated, including actuation of the time delay mechanism of the time responsive relay 218, beta particles emerging from the source 200 penetrate both discs 250 and 260 and are partially absorbed in the gold absorbers 252 on both discs. The Geiger-Müller tube 202 produces counts responsive to the intensity of the beta particles impinging thereon which are counted by the counter 204 and produce a voltage across resistors 206, 208 and 210. For lower intensity sources 200, the switch 212 is connected to the counter-end of the resistor 206 to include all voltage appearing across resistors 206 and 208.

Initially, the time responsive switch 218 has its first pole contact 222 connected to stationary contact 220, so that only the voltage appearing across resistor 210 apposes the voltage of the normal cell 224. Unless these voltages are equal, the meter relay 228 will connect its pole contact 230 to one of the two contacts 244 or 246, hence energizing the motor 242, since the second pole 233 of the time responsive switch 218 connects the source of power 234 to reversible motor 242 at this time. Depending upon whether the beta particles impinging upon the Geiger-Müller tube 202 produce pulses sufficient in number to develop a voltage across resistor 210 in excess of the normal cell across resistor 210 or less than the voltage of a normal cell across resistor 210, the disc 260 will be rotated to increase or decrease the thickness of the gold absorber disposed between the source 200 and the Geiger-Müller tube 202. When the proper thickness of gold absorber has been disposed between the source 200 and Geiger-Müller tube 202, meter relay will disconnect its pole contact 230 from both of the contacts 244 and 246, and the disc 260 will remain stationary. The time responsive relay 218 has a time delay period after its actuation sufficient to permit the disc 260 to seek the null position, a period of time of the order of thirty seconds being ample. After the lapse of this period of time, the time responsive relay 218 acts to connect its first pole contact 222 to contact 214, thus placing resistor 208 in series with resistor 210 in the meter relay balancing circuit, and also resistor 206 if the pole contact of switch 212 is connected to the junction of the counter 204 and resistor 206. At the same time, the second pole 233 of the time responsive relay 218 connects the second motor 238 to the source of power 234. It is clear that since the current through the three resistors has not changed, the potential difference over the resistors 208 and 210 will be now higher than the balancing potential supplied from the cell 224. As a result, the meter switch will connect the motor 238 in such a manner to the power source 234 that the disc 250 is rotated to place increasing thicknesses of absorber between the source 200 and the Geiger-Müller tube 202 until the voltage developed across resistors 208 and 210 again equals the potental of the normal cell 224. In this condition, the instrument comes to rest and motor 238 ceases rotation.

Rotation of the shaft 248 of the motor 238 to position the thickness of absorber 252 between the source 200 and the Geiger-Müller tube 202 also positions the pointer 264 on the indicator scale 262. The scale 262 may be calibrated to directly read end-point in energy mev. Since the end-point energy for each isotope is unique, the scale 262 directly indicates the identity of the source 200, and hence this information may be applied to the scale 262.

The device for automatically identifying beta emitting isotopes illustrated in Figures 5 through 7 selects two absorber thicknesses which produce two different standard electrical signals, here currents. The invention may also be practiced by utilizing a device which positions two different standard absorber thicknesses between the beta emitting source and the radiation responsive device and utilizes the ratio of the output signals to identify the radioactive isotope. The device illustrated in Figure 8 operates in this manner.

The source, designated 300, is disposed in a source holder 301 which confronts the Geiger-Müller tube 302 which is connected to a counter 304, in the same manner as the device illustrated in Figure 5. A first absorber 306 is fixedly positioned between the source 300 and Geiger-Müller tube 302. The absorber 306 contains a gold coating 307 of approximately 25 milligrams per square centimeter on plastic plate 309 of approximately 1 mg./cm.$^2$ thick. The output voltage from the counter 304 is developed across a rheostat 308, and the movable tap 310 of the rheostat 308 is connected mechanically to a reversible motor 312. Electrically the movable tap 310 is connected to the end of the rheostat 308 opposite to the counter 304, so that the position of the tap 302 shorts out a portion of the rheostat 308. The output of the counter 304 is also connected in series opposition with a cell 314, or other source of fixed and constant voltage, through the armature 316 of a meter relay 318. The pole terminal 320 of the meter relay 318 is connected to a source of power, such as battery 322, and both of the stationary contacts 324 and 326 of the meter relay 318 are connected to two of the three terminals of the reversible motor 312.

A triple pole, double throw time delay relay 328 has a first pair of switch contacts 330 which are connected in series with the armature 316 of the meter relay 318, this pair of switch contacts 330 being in the closed position prior to actuation of the time in a relay 328. The third terminal of the reversible motor 312 is connected to the battery 322 through the second pair of switch contacts 332 of the time delay relay 328, this pair of contacts 332 also being closed prior to actuation of the time delay relay 328. The third pair of switch contacts 334 of the time delay relay 328 are open prior to actuation of the time delay relay 328, and are connected in a series circuit with the coil 336 of a relay 338, the coil being connected across the source of power 322 when the switch contacts 334 are closed. The relay 338 has a shaft 340 which is attached to a gold absorber 342. The absorber 342 is spring biased by a spring 344 to position the absorber within the path between the source 300 and the Geiger-Müller tube 302, except when the relay 338 is actuated; and when the relay is actuated, the absorber 342 is removed from this path between the source 300 and Geiger-Müller tube 302. As in the other embodiments of the invention, the absorbers 306 and 344 are disposed within a distance equal to one-fourth the distance between the source 300 and the detector 302, and the solid angle of radiation incident upon the Geiger-Müller tube 302 active volume does not exceed 10% of the total angle.

An amplifier 346 is also connected to the output of the counter 304, and an indicator, such as a meter 348, is connected to the output of the amplifier 346. The meter 348 is provided with a logarithmic scale 350 which is calibrated directly in terms of the end-point energy of the emitting source 300, and also directly in terms of the identity of the source 300.

In operating the device illustrated in Figure 8, the operator merely places the source 300 in the position provided before he actuates the circuit. Actuation of the circuit starts the period of time delay of the switch 328. Reversible motor 312 adjusts the movable tap 310 on the rheostat 308 to null the voltage appearing across the unshorted portion of the rheostat 308 with the standard cell 314. Thereafter, the time delay relay 328 opens the circuit of the reversible motor 312, and also the balancing circuit including the armature 316 of the relay 318. The time delay relay 328 also removes the second absorber 342 from the path between the source 300 and the Geiger-Müller tube 302, hence reducing the total absorber thickness by the thickness of absorber 342. As a result, the voltage appearing at the input of the amplifier 306 increases, and this increase appears on meter 348. Since the scale is logarithmic, it is calibrated directly in end-point energy of the source and directly in terms of the identity of the source.

The invention relates to the isotopic analysis of radioactive substances undergoing beta disintegrations. However many beta emitting isotopes, particularly those with multiple branchings, emit in addition to their beta spectra also gamma rays.

G.-M. tubes have only a low sensitivity for gramma rays, about 1%; double and triple coincidence type detectors, as those used in this invention, have sensitivities of $10^{-4}$ and $10^{-6}$, respectively, for gamma rays. Nevertheless, in cases in which the counters of the coincidence equipment have thin windows positioned in such a manner that a secondary electron created by the gamma radiation can penetrate through all G.-M. counters of the coincidence equipment, the instrument will count in addition to the beta rays emitted from the source also some secondary electrons created by the gamma radiation. The counting-rate due to these secondary electrons will falsify the results of the analysis. Thus the instrument has to be made insensitive to the secondary electrons of the gamma radiation, or means provided to substract the counting-rate due to these secondary electrons before starting the analysis of the absorption curve.

Three of these possible and applicable methods are described below:

In cases in which it is known that the energy of the gamma radiations is lower than the lowest end point energy of all beta components, the following procedure can be applied.

Between the first and second counter of the coincidence equipment (numbers counted from the direction of the source), counters 14 and 12 in Figure 1, an absorber, designated 400, of low atomic number, e.g. aluminum, is placed. The thickness of this aluminum absorber should be equal to the range of the secondary electron of highest possible energy created by the gamma radiation. This absorber will prevent those secondary electrons created by the gamma rays to be able to trigger both counters simultaneously and thus actuate the indicator.

This method is particularly useful in the case of a quantitative analysis of a mixture with known components, as is the case in biological experiments with multiple tracers and in the case of isotope production where an impurity is produced along with the isotope and the amount of the impurity has to be determined.

In cases in which the energy of the gamma radiation is unknown, or their energy exceeds the end point energy of some of the beta spectra, the following procedures can be applied.

Using a double coincidence equipment, after having completed the measurement of the absorption curve, an absorber made of the same material as used for measuring the absorption curve, designated 402 in Figure 1, and of such thickness is placed between source 21 and first counter 14, the absorber 42 absorbing all beta rays, even those with the highest energy. The intensity measured with this particular absorber in place corresponds to the contribution of the gamma radiation to the coincidence rate observed with the thinner absorbers 34. Thus, the value measured with this thick absorber has to be subtracted from all intensities measured with thinner absorbers; i.e. from all values used for the determination of the absorption curve.

Using gold as the absorbers 34 for determing the absorption curve, a suitable absorber 402 is a layer of lead because the atomic number of lead and gold are not much different from each other.

A more correct method of eliminating the contribution of the gamma radiation to the measured intensity is by using triple coincidence equipment such as illustrated in Figure 9.

This method is based on a geometric arrangement of the source 404, counters 406, 408 and 410, apertures 412, 414, and 416, etc. which prevents the secondary rays created by the gamma rays of the source from triggering all three counters simultaneously. In the design of such an arrangement, the following conditions have to be considered. Between the first and second counters 406 and 408, an apertured plate 418 is positioned which limits the effective opening of the instrument to a cone illustrated by the lines A, B and C, D. This aperture is made from a material of at least 2 gm./cm.² thickness in all parts with the exception of its circular opening; thus it prevents all secondary electrons from penetrating through it on any other part than through the opening. Those parts of the source holder 220 which are situated within the cones A, B, and C, D are made of a material with low atomic number (e.g. polystyrene, polyethyltne or other plastic material).

The absorbers 422 to be used for the determination of the absorption curve are placed between the apertured plate 418 and counter 408. The source 404 is mounted to the source holder 420 in such a manner that no part of the source holder 420 within the cone A, B, and C, D is situated before the plane E—F perpendicular to the axis connecting the source and the center of the counters. The windows 412 of the first counter 406 are within the cone A, B, and C, D and made of material with a low atomic number. This arrangement prevents the triggering of all three counters of the coincidence equipment by means of a secondary ray of the gamma radiation of the source in the following manner.

Gamma rays create secondary electrons by means of photo-electric processes and Compton scattering. Electrons created by photo-electric effects can be emitted in all directions with respect to the impinging gamma ray. However, photo-electric effects occur only in negligible amounts in materials of low atomic number. The gamma rays from the source 404 do not create electrons by means of photo-electric effects in the source holder 220 itself because the latter is made of material of low atomic number. All materials with high atomic numbers, e.g. counter walls, the metal frame 424 of the source holder, are, on the other hand, outside of the cone A, B, and C, D. Photoelectrons created in the plate 418, the absorbers 422 and the walls of the counters 408 and 410 can for geometrical reasons not penetrate all three counters.

Electrons created in Compton scattering of the gamma rays, so called Compton electrons, are emitted only in the forward direction with respect to the impinging gamma ray. Since no part of the source holder 420 is situated before the plane E—F, gamma rays starting from the source and scattered in the material of the source holder can not create Compton electrons proceeding in the direction of the counters. The number of Compton electrons created in the thin windows 412 of counter 406 are negligible and Compton electrons created in the apertured plate 418, absorbers 422 and in the walls of counters 408 and 410 can not lead to triple coincidences for the same reasons as mentioned in connection with the photoelectrons.

The metal frame 424 of the source holder 404 can be closed on the side behind the source and thus protrude in the cone A, B, and C, D if care is taken that the source holder 404 is made of material with a low atomic number and should be at least 2 gm./cm.² thick in all parts between source and metal frame.

Figure 10:
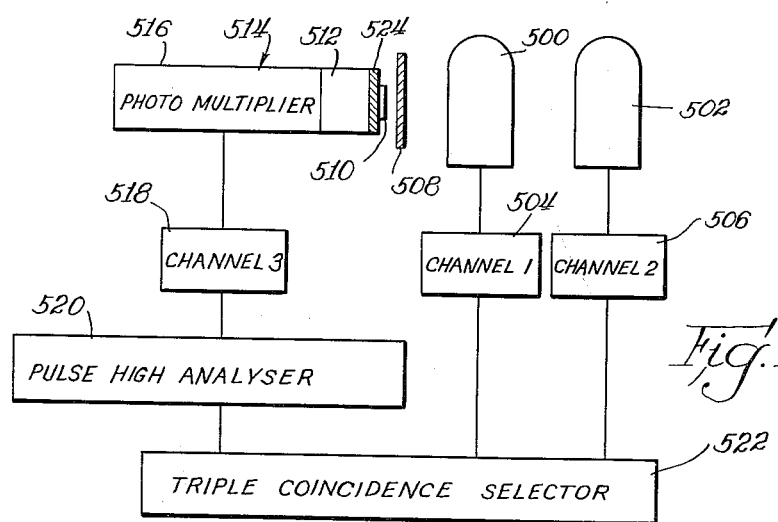
Figure 10 is a schematic view of a device constituting another embodiment of the invention.

The analysis of radioactive isotopic mixtures with many constituents, particularly in which the isotopic components have several branched beta transitions, is tedious and difficult to manage. This difficulty can be overcome by means of the following variant of the invention; explained with reference to Figure 10.

Two beta detectors 500 and 502 are connected through channel 1 and channel 2, designated 504 and 506, respectively, with a triple coincidence selector operating in a similar manner as in the equipment described so far. The absorbers 508 are, as before, positioned between source 510 and G.-M. counter 500. However, the source 510 is mounted on the scintillation phosphore 512 of a scintillation counter 514, the latter being sensitive for gamma radiation. The pulses from the photomultiplier 516 of the scintillation counter are fed through channel 3, designated 518 to the triple coincidence selector. With the help of a pulse height analyzer 520 interposed between channel 3 and the triple coincidence selector 522 a narrow energy band of the gamma rays can be selected and only these are fed to the triple coincidence selector 522. To insure that the scintillation counter 514 should not be triggered by the beta rays of the source 510, an absorber 524 is placed between source and scintillation phosphore, whereby the thickness of absorber 524 is such (about 2 gm./cm.²) that it absorbs all beta particles from the source 510.

Isotopes which have branched beta transitions usually emit one gamma ray simultaneously with each beta component. The gamma radiation emitted from the source triggers the scintillation counter 514 with an efficiency of 30–50 percent. The simultaneous beta ray triggers the G.-M. counters 500 and 502. The pulses from the scintillation counter 514 and the two G.-M. counters being simultaneous will lead to triple coincidences registered on the indicator 526 through the scaler 528. Through proper setting of the pulse height analyzer 520 one can select a narrow energy band of the gamma radiation. Consequently, only those beta rays of the source will be detected by the instrument which are simultaneous with the gamma rays comprised in the selected narrow energy band. The absorption analysis of the beta components corresponding to the selected band is performed in similar manner as described earlier in this disclosure; i.e. by interposing the absorbers between source and first G.-M. counter 500.

The various beta components emitted from the source can be separately investigated by changing the setting of the pulse height analyzer to different energy bands of the gamma radiation.

It is obvious that instead of the scintillation counter any other means to measure gamma radiation can be applied and similarly instead of the G.-M. counters other beta sensitive detectors can be used.

The instrument can be very advantageously adapted for the determination of impurities produced together with the requested isotope in isotope production plants.

The impurities produced together with other isotopes are due to the fact that the irriadiated target material is never absolutely pure and thus when irradiated not only the main material but also the impurity will be transformed into radioactive isotopes. In these cases the nature of the isotope to be produced and similarly the nature of the impurity is known. It is of importance, however, to know the percentage amount of the impurity at the time when shipment of the isotope is made. The tenet of the present invention can be adopted for the fast determination of the percentage content of such impurities in the following manner.

The instrument is basically identical to the one described in Figure 1; the only difference being that instead of using different absorbers of fixed thicknesses, an absorber of variable thickness is used made of a strip along which the absorber thickness increases continuously (absorber wedge), or a circular disk is used as the absorber, like in Figure 6 and Figure 7, the absorber being placed along the periphery of the disc, the thickness of the absorber increasing with the angle of rotation.

The output of the coincidence network is fed instead into a scaler in a count rate meter. The instrument is first calibrated with known mixtures of the two isotopic components in question. With each calibrating mixture a first reading is taken on the count rate meter when an absorber is interposed which reduces the intensity to one half of its original value. Thereafter the range selector of the count-rate meter is switched to a (3-times, 5-times or 10-times) higher sensitivity range and the longitudinal or circular wedge absorber is interposed between source and detector in addition to the first absorber placed in the beam in the previous measurement. The absorber wedge thickness is increased until the deflection on the count-rate meter is the same as was found in the first measurement. The position of the wedge at which this situation is established is marked as corresponding to the given percentage admixture of impurity in this calibrating mixture.

The same procedure is repeated with a set of similar calibrating mixtures of different percentages in the components, thus to each position of the wedge the corresponding percentage relationship of the components is defined.

Using an unknown mixture of the same isotopes, exactly the same measurements are repeated as with the calibrating mixtures, only now from the position of the wedge at which with higher sensitivity range of the count rate meter the same deflection is estabilshed as with the first absorber, the impurity content of the mixture in percents can be established.

It can be seen that the here described procedure is basically identical to the one applied in the device for automatically identifying isotopes described in columns 5 to 7, and in Figures 5 to 7. It is therefore obvious that the scale 262 of the device illustrated on Figure 5 can be similarly calibrated for a certain main isotope to indicate percentage of admixed impurity.

From the foregoing disclosure, the man skilled in the art will readily devise many modifications and foresee additional advantages within the intended scope of the invention. For these reasons, it is intended that the present invention be not limited by the foregoing disclosure, but rather only by the appended claims.

The invention claimed is:

1. A device for determining the absorption curve of radioactive isotopes comprising a beta particle detector, a source holder disposed at a distance from the detector, means to limit the solid angle of radiation emerging from a source mounted in the source holder and incident upon the detector to not more than 10% of a complete solid angle, non-radioactive beta particle absorbing means disposed on the axis between the source holder and the detector, said absorbing means being spaced from the source holder by a distance equal to not more than one-half of the distance between the sample holder and the detector, and said beta particle absorbing means having absorbing material having an atomic number of at least 47 intersecting the axis between the source holder and detector, and including means to vary the thickness of the absorbing material, means connected to the detector to generate an electrical signal monotonically related to the output of the detector, means connected to the means to vary the thickness of the absorber to consecutively adjust the magnitude of said signal to a first fixed value and a second fixed value.

2. A device for determining the absorption curve of radioactive isotopes comprising a beta particle detector, a source holder disposed at a distance from the detector, means to limit the solid angle of radiation emerging from a source mounted in the source holder and incident upon the detector to not more than 10% of a complete solid angle, non-radioactive beta particle absorbing means disposed on the axis between the source holder and the detector, said absorbing means being spaced from the source holder by a distance equal to not more than one-half of the distance between the sample holder and the detector, said absorbing means comprising a pair of parallel discs constructed of material permeable to beta particles and rotatable relative to each other on a common axis, said discs being intersected by the axis between the source holder and the detector between the periphery thereof and the common axis, and a coating of non-radioactive material having an atomic number of at least 47 disposed on each of said discs in a circular strip adjacent to the periphery of the discs, the strips of said discs confronting each other and having portions aligned with the axis between the source holder and the detector, the thickness of said coating varying continuously from a minimum to a maximum around the periphery of the discs.

3. A device for determining the absorption curve of radioactive isotopes comprising the elements of claim 2 wherein the coatings of non-radioactive material on the discs consist of gold.

4. A device for determining the absorption curve of radioactive isotopes comprising the elements of claim 2 in combination with means connected to the detector for developing an electrical signal monotonically related to the response of the detector, means mechanically coupled to one of the discs and electrically coupled to the signal developing means to position the first disc to limit the signal developed by the signal developing means to a first fixed value, and means mechanically coupled to the other of said discs and electrically coupled to the signal developing means to position the second disc to limit the signal developed by the signal developing means to a second fixed value.

5. A device for determining the absorption curve of radioactive isotopes comprising the elements of claim 4 in combination with means for actuating the means for positioning the second disc, said actuating means being coupled to the means for positioning the first disc and including a time delay switch, whereby the first disc is positioned before the second disc.

6. A device for determining the absorption curve of radioactive isotopes comprising a beta particle detector, a source holder disposed at a distance from the detector, means to limit the solid angle of radiation emerging from a source mounted in the source holder and incident upon the detector to not more than 10% of a complete solid angle, means to generate a current monotonically related to the response of the detector electrically connected to the detector and including a pair of serially connected resistors, a bridge circuit including in series the first of said resistors, the armature of a meter relay, and a source of voltage connected to oppose the potential developed across the first resistor, the meter relay having a pole contact and a pair of stationary contacts, a first reversible motor electrically connected to one of the stationary contacts of the meter relay, a source of power and a double throw switch electrically connected between the pole contact of the meter relay and the first motor, a first disc constructed of material permeable to beta particles mechanically coupled to the first motor, said disc intersecting the axis between the detector and source holder, a coating of gold disposed on said disc, the thickness of said coating varying continuously from a minimum to a maximum around the periphery thereof, a second reversible motor electrically connected to the stationary contacts of the meter relay and to the selection switch, a second disc constructed of material permeable to beta particles mechanically coupled to the second motor, said second disc also intersecting the axis between the source holder and detector, a coating of gold disposed on said second disc, the thickness of said coating varying uniformly from a minimum to a maximum around the periphery thereof, and means to connect the second resistor into series with the first resistor in the bridge circuit.

7. A device for determining the absorption curve of radioactive isotopes comprising a beta particle detector, a source holder disposed at a distance from the detector, means to limit the solid angle of radiation emerging from the source mounted in the source holder and incident upon the detector to not more than 10% of a complete solid angle, a means to generate a current monotonically related to the response of the detector electrically connected to the detector and including a resistor, means to adjust the potential difference appearing across said resistor to a fixed reference value, and means to change the thickness of the absorber between the isotope and detector by a fixed amount.

8. A device for determining the absorption curve of radioactive isotopes comprising a beta particle detector, a source holder disposed at a distance from the detector, means to limit the solid angle of radiation emerging from the source mounted in the source holder and incident upon the detector to not more than 10% of a complete solid angle, a first gold absorber disposed between the isotope and the detector, a second gold absorber disposed between the isotope and the detector, means to generate a current monotonically related to the response of the detector electrically connected to the detector including a resistor, means to establish a reference potential across said resistor, and means to remove the second gold absorber from the path between the isotope and the detector.

9. A device for determining the absorption curve of radioactive isotopes comprising the elements of claim 8 wherein the resistor is a variable resistor having a movable element, and the means for establishing a reference potential across said resistor comprises a bridge circuit including said resistor, a voltage cell, and a meter relay connected in series, the movable element of the resistor being connected to one end thereof, a reversible motor having a rotatable shaft mechanically linked to the movable element of the resistor, said reversible motor having three electrical terminals, and the meter relay having a pole terminal and a pair of stationary terminals, two of the electrical terminals of the motor being connected to the stationary terminals of the meter relay and the third terminal of the motor being connected to the poll terminal of the meter relay.

10. A device for determining the absorption curve of radioactive isotopes comprising a first beta particle detector, a source holder disposed at a distance from the detector, a second beta particle detector disposed on the opposite side of the first detector from the source and aligned with the first detector and the source holder, a third beta particle detector disposed at the side of the second beta particle detector opposite to the first beta particle detector and aligned with the first and second beta particle detectors, means to limit the solid angle of radiation from the source holder positioned between the first and second beta particle detectors, means connected to the first, second and third beta particle detectors to determine triple coincidences, absorbing means positioned between the first and second beta particle detectors including material with an atomic number of at least 47, and means to vary the thickness of said material.

11. A device for determining the absorption curve of radioactive isotopes comprising a first Geiger-Müller counter, a second Geiger-Müller counter, a scintillation counter, the first and second Geiger-Müller counters and scintillation counter being aligned, absorbing means positioned between the scintillation counter and the first GeigerMüller counter including material with an atomic number of at least 47, means to vary the thickness of the said material, a pulse height analyser connected to the scintillation counter, and means connected to the pulse height analyser and the first and second Geiger-Müller counters to determine triple coincidences.

12. A device for determining the absorption curve of radioactive isotopes comprising the elements of claim 1 in combination with means for generating an indication of the logarithm of the difference in thickness of the first fixed value and the second fixed value of the absorber.

13. A device for determining the absorption curve of radioactive isotopes comprising the elements of claim 7 in combination with means to generate an indication of the logarithm of the difference in magnitude of the reference potential across the resistor and the potential across said resistor with the changed absorber thickness.

14. A device for determining the absorption curve of radioactive isotopes comprising the elements of claim 8 in combination with means to generate an indication of the logarithm of the difference in the potential across the resistor of the current generating means with the second absorber removed from the reference potential across said resistor.

15. A device for determining the absorption curve of a radioactive isotope comprising a beta particle detector, a source holder disposed at a distance from the detector, means to limit the solid angle of radiation emerging from a source mounted in the source holder and incident upon the detector to not more than ten percent of a complete solid angle, means to position a first non-radioactive beta particle absorbing means between the source holder and the detector, said absorbing means being spaced from the source holder by a distance equal to not more than one-half of the distance between the sample holder and the detector, and said beta particle absorbing means having absorbing material with an atomic number of at least 47, means electrically connected to the detector for establishing the sensitivity of the detector at one of two levels, means to insert a second non-radioactive beta particle absorbing means between the source holder and the detector, said second absorbing means also being spaced from the source holder by a distance equal to not more than one-half of the distance between the sample holder and the detector, and said second beta particle absorbing means having absorbing material with an atomic number of at least 47 intersecting the axis between the source holder and the detector, the absorption of the second beta particle absorbing means being selected to reduce the output of the detector when operating at the high sensitivity level to the same level as the output thereof without the second absorbing means when operating at the low sensitivity level, whereby the thickness of the second absorber detemines the absorption curve of the source.

16. A device for determining the absorption curve of a radioactive isotope comprising the elements of claim 15 in combination with a second beta particle detector aligned with the first beta particle detector and the source holder and positioned on the side of the first beta particle detector remote from the source holder, and a coincidence selector electrically connected to the first and second beta particle detectors.

17. A device for determining the absorption curve of radioactive isotopes comprising the elements of claim 1 in combination with a second beta particle detector aligned with the first beta particle detector and the source holder and positioned on the side of the first beta particle detector remote from the source holder, and a coincidence selector electrically connected to the first and second beta particle detectors.

18. A device for determining the absorption curve of a radioactive isotope comprising the elements of claim 15 in combination with a scintillation counter having a scintillation phosphore positioned adjacent to the isotope, a pulse height analyser electrically connected to the scintillation counter, and a coincidence selector electrically connected to the pulse height analyser and the beta particle detector.

19. A device for determining the absorption curve of a radioactive isotope comprising the elements of claim 7 in combination with a scintillation counter adjacent to the isotope, a pulse height analyser electrically connected to the scintillation counter, and a coincidence selector electrically connected to the pulse height analyser and the beta particle detector.

References Cited in the file of this patent

UNITED STATES PATENTS

| | | |
|---|---|---|
| 1,907,750 | Jarnette | May 9, 1933 |
| 2,543,675 | Swift | Feb. 27, 1951 |
| 2,599,166 | Dempster | June 3, 1952 |
| 2,666,857 | McLaren | Jan. 19, 1954 |
| 2,675,479 | Stewart | Apr. 13, 1954 |
| 2,692,950 | Wallace | Oct. 26, 1954 |

OTHER REFERENCES

Method for the Determination of the End-Point Energy of Beta Emitters by M. Forro, published in Physical Review, vol. 92, #4, November 1953, pages 931–933.